US010225233B2

United States Patent
Khare et al.

(10) Patent No.: US 10,225,233 B2
(45) Date of Patent: Mar. 5, 2019

(54) MEDIA ACCESS CONTROL (MAC) ADDRESS LEARNING IN VIRTUALIZED COMPUTING ENVIRONMENTS

(71) Applicant: Nicira, Inc., Palo Alto, CA (US)

(72) Inventors: Shrikrishna Khare, Palo Alto, CA (US); Boon Ang, Palo Alto, CA (US); Guolin Yang, Palo Alto, CA (US); Subin Cyriac Mathew, Palo Alto, CA (US)

(73) Assignee: NICIRA, INC., Palo Alto, CA (US)

( * ) Notice: Subject to any disclaimer, the term of this patent is extended or adjusted under 35 U.S.C. 154(b) by 50 days.

(21) Appl. No.: 15/616,909

(22) Filed: Jun. 7, 2017

(65) Prior Publication Data
US 2018/0359215 A1 Dec. 13, 2018

(51) Int. Cl.
| | |
|---|---|
| *H04L 29/12* | (2006.01) |
| *H04L 12/741* | (2013.01) |
| *H04L 12/823* | (2013.01) |
| *H04L 12/813* | (2013.01) |
| *H04L 12/721* | (2013.01) |
| *H04L 12/46* | (2006.01) |
| *G06F 9/455* | (2018.01) |

(52) U.S. Cl.
CPC ...... *H04L 61/6022* (2013.01); *G06F 9/45558* (2013.01); *H04L 12/4641* (2013.01); *H04L 45/72* (2013.01); *H04L 45/74* (2013.01); *H04L 47/20* (2013.01); *H04L 47/32* (2013.01); *G06F 2009/4557* (2013.01); *G06F 2009/45595* (2013.01)

(58) Field of Classification Search
CPC . H04L 61/6022; H04L 12/4641; H04L 45/72; H04L 45/74; H04L 47/20; H04L 47/32; G06F 9/45558; G06F 2009/4557; G06F 2009/45595

See application file for complete search history.

(56) References Cited

U.S. PATENT DOCUMENTS

| | | | | |
|---|---|---|---|---|
| 8,472,443 B2 * | 6/2013 | Enduri | ............ | H04L 49/70 370/392 |
| 8,645,576 B2 * | 2/2014 | Farinacci | ............ | H04L 12/4641 370/254 |
| 8,717,934 B2 * | 5/2014 | Bacthu | ............ | H04L 12/4641 370/254 |

(Continued)

*Primary Examiner* — Habte Mered
(74) *Attorney, Agent, or Firm* — Su IP Consulting (57) ABSTRACT

Example methods are provided for a host to perform Media Access Control (MAC) address learning in a virtualized computing environment. The host includes multiple physical network interface controllers (NICs) configured as a team. The method may comprise: in response to detecting an egress packet that includes a source MAC address from a virtualized computing instance, learning address mapping information that associates the source MAC address with a virtual port; and sending the egress packet to a physical network via a first physical NIC selected from the team based on a NIC teaming policy. The method may also comprise: in response to detecting an ingress packet that also includes the source MAC address, determining whether the source MAC address has moved based on whether the ingress packet is received via the first physical NIC, or a second physical NIC from the team, but otherwise, maintaining the address mapping information.

21 Claims, 7 Drawing Sheets

(56) References Cited

U.S. PATENT DOCUMENTS

| | | | | |
|---|---|---|---|---|
| 8,879,554 B2* | 11/2014 | Emmadi | ................. | H04L 49/30 370/389 |
| 9,148,360 B2* | 9/2015 | Vishveswaraiah | .... | H04L 12/467 |
| 9,736,054 B2* | 8/2017 | Bacthu | ................ | H04L 12/4633 |
| 2009/0296727 A1* | 12/2009 | Srinivasan | .......... | H04L 12/4625 370/402 |
| 2009/0296728 A1* | 12/2009 | Srinivasan | .......... | H04L 12/4625 370/402 |
| 2013/0103817 A1* | 4/2013 | Koponen | ............ | G06F 9/45558 709/223 |
| 2013/0182722 A1* | 7/2013 | Vishveswaraiah | .... | H04L 12/467 370/475 |
| 2014/0254594 A1* | 9/2014 | Gasparakis | ............. | H04L 45/74 370/392 |
| 2015/0030027 A1* | 1/2015 | Manzella | ............ | H04L 12/4641 370/392 |

* cited by examiner

MEDIA ACCESS CONTROL (MAC) ADDRESS LEARNING IN VIRTUALIZED COMPUTING ENVIRONMENTS

BACKGROUND

Unless otherwise indicated herein, the approaches described in this section are not admitted to be prior art by inclusion in this section.

Virtualization allows the abstraction and pooling of hardware resources to support virtual machines in a virtualized computing environment, such as a Software-Defined Datacenter (SDDC). For example, through server virtualization, virtual machines running different operating systems may be supported by the same physical machine (e.g., referred to as a "host"). Each virtual machine is generally provisioned with virtual resources to run an operating system and applications. The virtual resources may include central processing unit (CPU) resources, memory resources, storage resources, network resources, etc. In practice, multiple physical network interface controllers (NICs) may be configured as a NIC team at a host to improve network throughput and fault tolerance. However, the NIC team may present new challenges in relation to Media Access Control (MAC) address learning at the host.

DETAILED DESCRIPTION

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the drawings, can be arranged, substituted, combined, and designed in a wide variety of different configurations, all of which are explicitly contemplated herein.

Challenges relating to Media Access Control (MAC) address learning will now be explained in more detail using FIG. 1, which is a schematic diagram illustrating example virtualized computing environment 100 in which MAC address learning may be implemented. It should be understood that, depending on the desired implementation, virtualized computing environment 100 may include additional and/or alternative components than that shown in FIG. 1.

Figure 1:
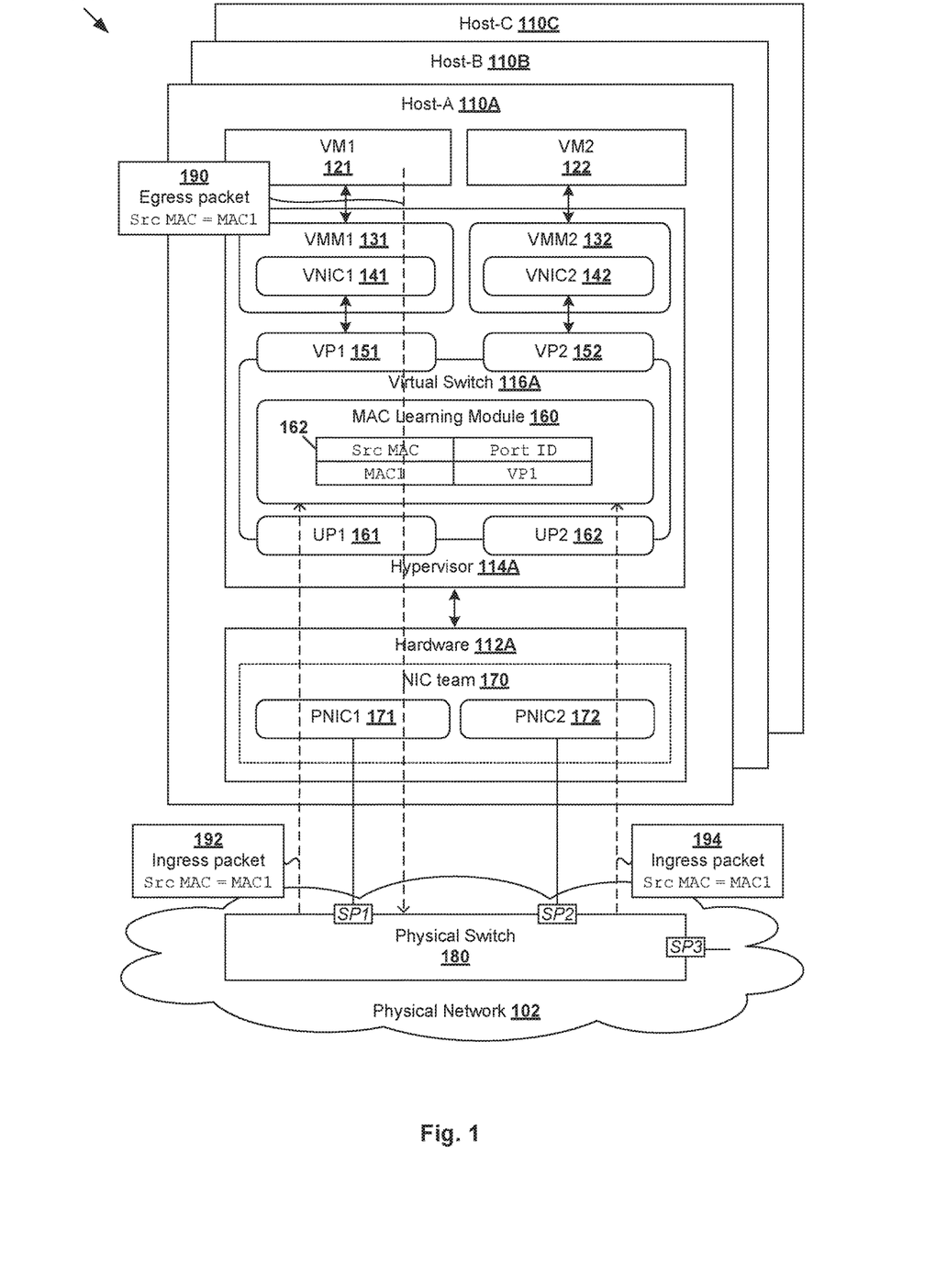
FIG. 1 is a schematic diagram illustrating an example virtualized computing environment in which media access control (MAC) address learning may be implemented.

In the example in FIG. 1, virtualized computing environment 100 includes multiple hosts, such as host-A 110A, host-B 110B and host-C 110C that are inter-connected via physical network 102. Each host 110A/110B/110C includes suitable hardware and virtualization software (e.g., hypervisor) to support various virtual machines. Using host-A 110A as an example, hardware 112A and hypervisor 114A may be used to support VM1 121 and VM2 122. In practice, virtualized computing environment 100 may include any number of hosts (also known as a "computing devices", "host computers", "host devices", "physical servers", "server systems", etc.), where each host may be supporting tens or hundreds of virtual machines.

Although examples of the present disclosure refer to virtual machines, it should be understood that a "virtual machine" running on host 110A/110B/110C is merely one example of a "virtualized computing instance" or "workload." A virtualized computing instance may represent an addressable data compute node or isolated user space instance. In practice, any suitable technology may be used to provide isolated user space instances, not just hardware virtualization. Other virtualized computing instances may include containers (e.g., running on top of a host operating system without the need for a hypervisor or separate operating system such as Docker, etc.; or implemented as an operating system level virtualization), virtual private servers, client computers, etc. The virtual machines may also be complete computational environments, containing virtual equivalents of the hardware and software components of a physical computing system. As used herein, the term "hypervisor" may refer generally to a software layer or component that supports the execution of multiple virtualized computing instances, including system-level software that supports namespace containers such as Docker, etc.

Hypervisor 114A maintains a mapping between underlying hardware 112A and virtual resources allocated to virtual machine 121/122. Hardware 112A includes suitable physical components (not all shown for simplicity), such as processor(s), memory (e.g., random access memory), storage disk (e.g., solid state drive, hard disk drive), and multiple physical network interface controllers (PNICs) 171-172, etc. PNIC1 171 and PNIC2 172 provide multiple connections to one or more network devices (e.g., switches, routers, etc.) located on physical network 102. In the example in FIG. 1, PNIC1 171 and PNIC2 172 are connected to respective switch ports "SP1" and "SP2" at physical switch 180. PNIC1 171 and PNIC2 172 are connected with virtual switch 116A via respective uplink ports labelled "UP1" 161 and "UP2" 162, where there is a 1:1 association between a PNIC and an uplink port in this example. Packets from host-A 110A may be forwarded to physical network 102 via UP1 161 connected with PNIC1 171 or UP2 162 connected with PNIC2 172.

Virtual resources are allocated to virtual machine 121/122 to support a guest operating system and application(s), etc. For example, corresponding to hardware 112A, the virtual resources may include virtual CPU, virtual memory, virtual disk, virtual network interface controller (VNIC), etc. Virtual machine monitors (VMMs) 131-132 are implemented by hypervisor 114A are to emulate hardware resources. For example, VMM1 131 is to emulate VNIC 141 to provide network access for VM1 121, while VMM2 132 is to emulate VNIC 141 for VM2 122. In practice, VMM 131/132 may be considered as components that are part of, or separated from, virtual machine 121/122. In both cases, VMM 131/132 maintains state information of VNIC 141/142. When virtual machine 121/122 is migrated, the state information is also migrated.

Hypervisor 114A further supports virtual switch 116A to handle traffic forwarding to and from VM1 121 and VM2 122. Virtual switch 116A may represent a logical collection of virtual ports, such as VP1 151 associated with VM1 121 and VP2 152 associated with VM2 122. Virtual switch 116A detects egress (i.e., outgoing) packets from VM1 121 via VP1 151, and forwards them via PNIC 171/172. Virtual switch 116A also detects ingress (i.e., incoming) packets from PNIC 171/172, and forwards them to VM1 121 or VM2 122. The term "packet" may refer generally to a group of bits that can be transported together from a source to a destination, such as message, segment, datagram, etc.

To facilitate packet forwarding, virtual switch 116A performs MAC address learning by inspecting the source MAC address of every packet received via a particular port. For example in FIG. 1, based on egress packet 190 received from VM1 121, virtual switch 116A updates MAC table 162 to store address mapping information that associates source MAC address=MAC1 in egress packet 190 with a port identifier (ID) of VP1 151 via which egress packet is received. This way, when virtual switch 116A receives packets that are destined for MAC1, the packets are forwarded to VM1 121 via VP1 151. Otherwise, if a packet is destined for an unknown MAC address, the packet will be flooded to all ports except the port via which the packet is received, which generates more traffic in virtualized computing environment 100.

In the example in FIG. 1, NIC teaming is used to configure PNICs 171-172 as NIC team 170. As used herein, the term "NIC team" may refer generally the grouping of multiple PNICs into one logical NIC for fault tolerance purposes. As a fault tolerance mechanism, each member of NIC team 170 is capable of connecting to physical network 102 independently of other members. In the event of a failure at one PNIC, traffic may be directed to another PNIC according to a failover mechanism. NIC teaming may also be configured to improve throughput and support load balancing among members of NIC team 170. During packet forwarding, egress packets sent to NIC team 170 are dispatched to one of its members according to a NIC teaming policy.

As used herein, the term "NIC teaming policy" (also known as a load balancing algorithm) may refer generally to one or more criteria, rules or conditions that are used to select a member of NIC team 170 to forward egress packets from a particular virtual machine. In one example, the NIC teaming policy may be based on a source port ID, such as ID="VP1" associated with VP1 151 of VM1 121 and ID="VP2" associated with VP2 152 of VM2 122. In another example, a load-based NIC teaming policy may be used. In this case, PNIC 171/172 is also selected from NIC team 170 based on the source port ID. However, when the load at a particular PNIC reaches a predetermined threshold, a source port ID (and associated virtual machine) mapped to that PNIC might be moved to another PNIC with a lower load.

The above NIC teaming policies are relatively convenient to implement by host 110A because they generally do not necessitate any configurations or modifications at physical switch 180. However, they also create some new problems in relation to MAC address learning. For example, since no changes to physical switch 180 are required, physical switch 180 is generally unaware of the configuration of NIC team 170. Consequently, in some cases, when packets originated from VM1 121 are sent via one PNIC, physical switch 180 might send the packets back to host-A 110A via other PNIC(s). If MAC table 162 is updated as a result of those reflected packets, subsequent packet forwarding may not be performed correctly. Further, the association between a MAC address and a port might change (known as a "MAC move") due to various events such as virtual machine migration, failover, etc. In this case, address mapping information in MAC table 162 should be updated.

MAC Address Learning

According to examples of the present disclosure, MAC address learning may improved at host-A 110A that includes multiple PNICs 171-172 configured as NIC team 170. Using examples of the present disclosure, the interplay between MAC address learning, NIC teaming and events (e.g., migration, failover, etc.) that cause a MAC move may be considered. As will be explained using various examples below, this helps reduce the likelihood of, if not avoid, incorrect MAC address learning that leads to incorrect behavior by virtual switch 116A during packet forwarding.

Figure 2:
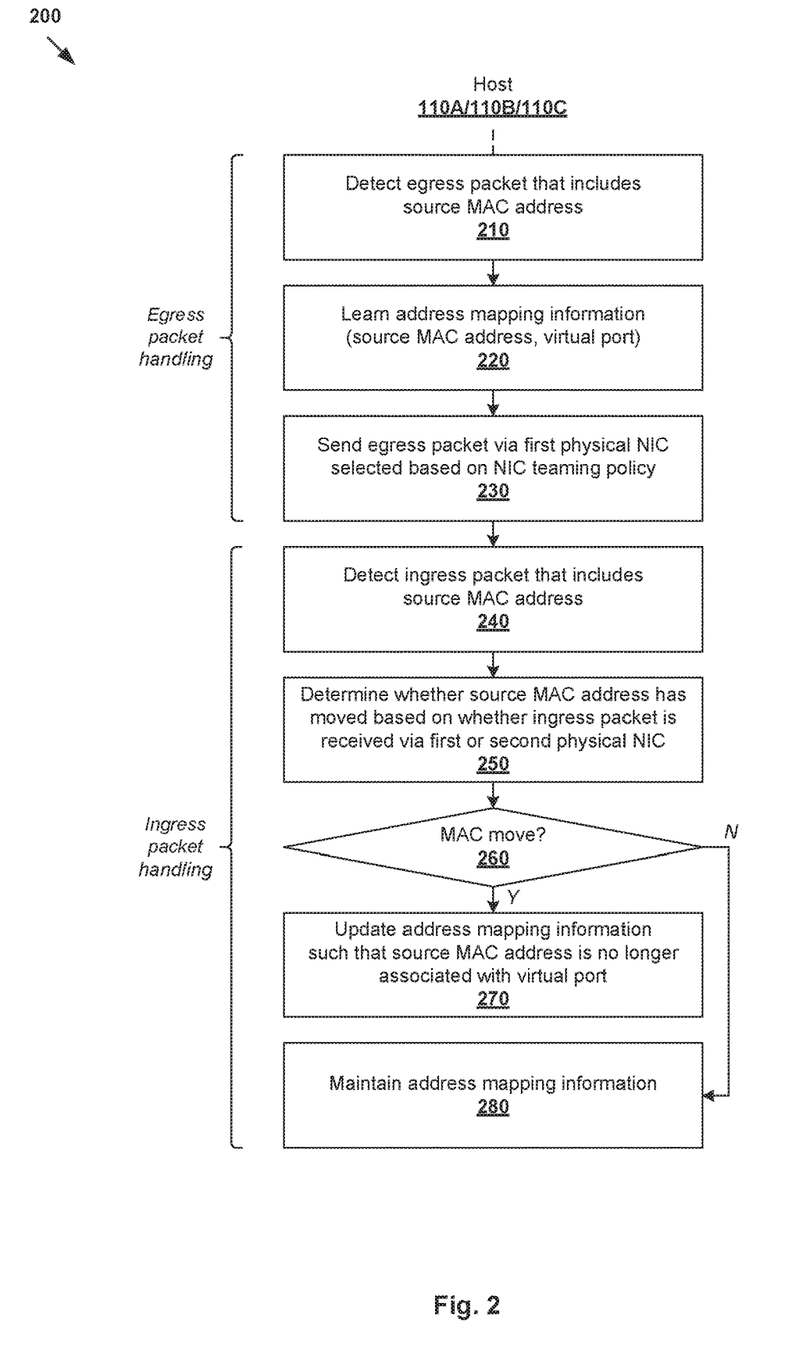
FIG. 2 is a flowchart of an example process for a host to perform MAC address learning in a virtualized computing environment.

In more detail, FIG. 2 is a flowchart of example process 200 for host 110A to perform MAC address learning in virtualized computing environment 100. Example process 200 may include one or more operations, functions, or actions illustrated by one or more blocks, such as 210 to 280. The various blocks may be combined into fewer blocks, divided into additional blocks, and/or eliminated depending on the desired implementation. In the following, various examples will be explained using host-A 110A as an example "host," and VM1 121 as an example "virtualized computing instance." Example process 200 may be implemented by host-A 110A using virtual switch 116A and more particularly MAC learning module 160, etc.

At 210 and 220 in FIG. 2, in response to detecting egress packet 190 that includes a source MAC address from VM1 121 supported by host-A 110A, address mapping information is learned. In the example in FIG. 1, MAC table 162 is updated with address mapping information that associates source MAC address=MAC1 in egress packet 190 with VP1 151 via which egress packet 190 is received. As will be explained further using FIG. 3, each detected egress packet has a source MAC address, based on which a MAC learning process may be performed. Note that the term "learning" at 220 may include host-A 110A adding a new entry associated with MAC1 to MAC table 162, or refreshing a timestamp of an existing entry associated with MAC1.

At 230 in FIG. 2, egress packet 190 is sent to physical network 102 via PNIC1 171 ("first physical NIC") selected by a NIC teaming policy from NIC team 170. For example, as discussed using FIG. 1, PNIC1 171 may be selected based on source port ID="VP1" associated with virtual port VP1 151 associated with VM1 121.

At 240 and 250 in FIG. 2, in response to detecting ingress packet 192/194 that also includes the source MAC address, it is determined whether the source MAC address has moved. At 260 and 270, in response to determination that the source MAC address has moved, the address mapping information is updated such that the source MAC address is no longer associated with VP1 151. Otherwise, the address mapping information is maintained.

The determination at 250 may be based on whether ingress packet 192/194 is received from physical network 102 via PNIC1 171 ("first physical NIC") selected by the NIC teaming policy, or PNIC2 172 ("second physical NIC"). For example, FIG. 1 shows two ingress packets that are received via different PNICs.

In a first example scenario, first ingress packet 192 is received via PNIC1 171 connected with UP1 161 at virtual switch 116. In this case, in response to determination that first ingress packet 192 is a MAC move advertisement that is received via PNIC1 171, it is determined that a MAC move has occurred. Examples of the first scenario will be discussed below using FIG. 3, FIG. 6 and FIG. 7, where the MAC move advertisement is generated by a hypervisor of another host (e.g., host-B 110B) in response to a migration, failover, etc.

The MAC move advertisement may be generated using any suitable protocol, such as such as Gratuitous Address Resolution Protocol (GARP), Reverse Address Resolution Protocol (RARP) packet, etc. In practice, the MAC move advertisement is generated to trigger network devices (e.g., physical switch 180) on physical network 102 to learn new address mapping information associated with a particular MAC address, such as after a virtual machine is powered on, when NIC teaming mode changes, failover, migration, etc. The Virtual Router Redundancy Protocol (VRRP), for example, uses GARP packets to advertise virtual MAC address migration.

In a second example scenario, second ingress packet 194 is received via PNIC2 172 connected with UP2 162 at virtual switch 116. In this case, in response to determination that second ingress packet 194 is a MAC move advertisement that is received via PNIC2 172 (i.e., not selected by the NIC teaming policy), it is determined that a MAC move has not occurred. Some examples will be described further using FIG. 5, FIG. 6 and FIG. 7, where second ingress packet 194 may be a loopback packet, or a legitimate MAC move advertisement that will be ignored.

In a third example scenario, in response to determination that ingress packet 192/194 is not a MAC move advertisement that is received either via PNIC1 171 or PNIC2 172, it is also determined that a MAC move has not occurred. Some examples will be discussed below using FIG. 3 and FIG. 4.

Detailed Process

Figure 3:
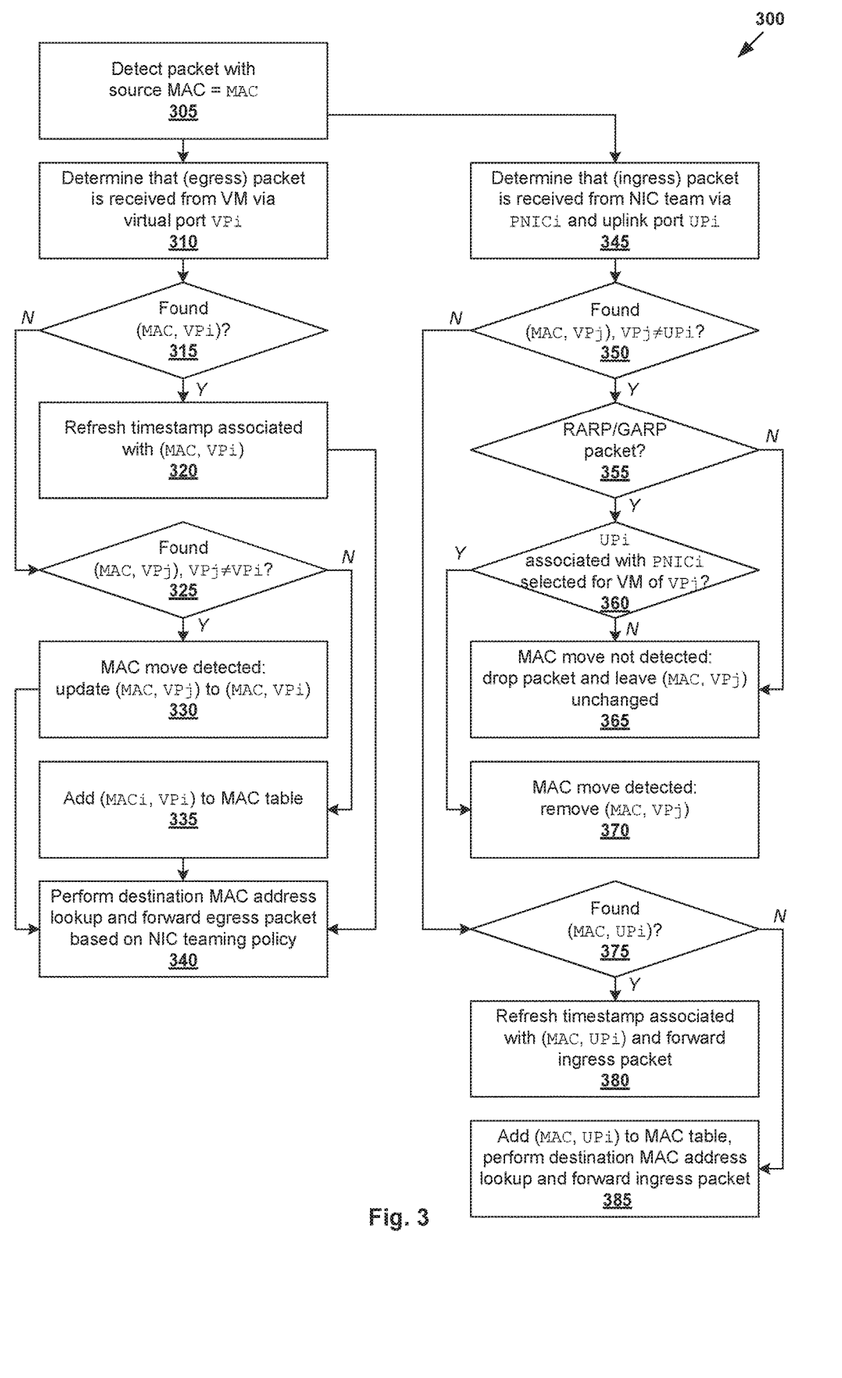
FIG. 3 is a flowchart of an example detailed process for a host to perform MAC address learning in a virtualized computing environment.
Figure 4:
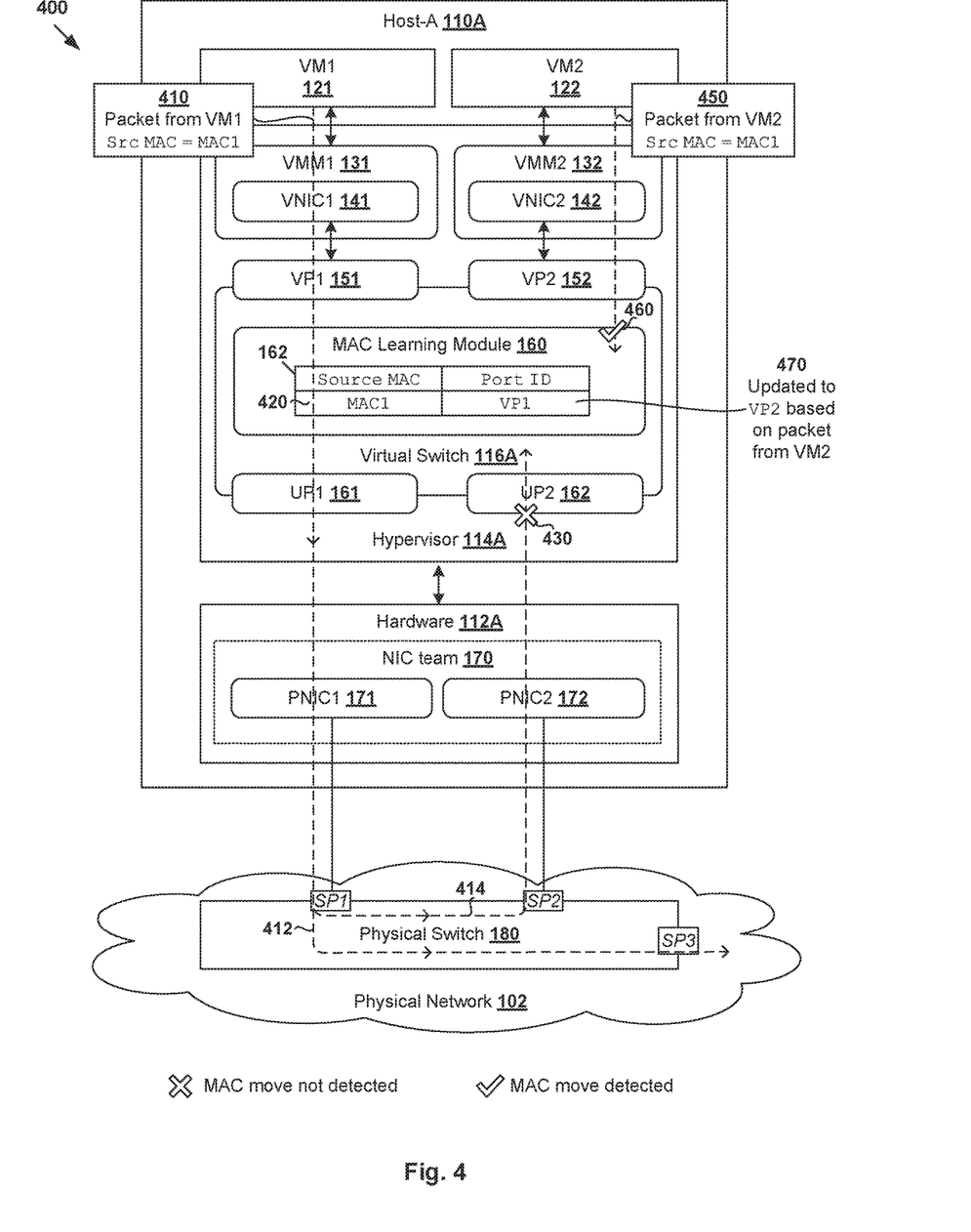
FIG. 4 is a schematic diagram illustrating an example of MAC address learning in a virtualized computing environment.

FIG. 3 is a flowchart of example detailed process 300 for host 110A to perform MAC address learning in virtualized computing environment 100. Example process 300 may include one or more operations, functions, or actions illustrated by one or more blocks, such as 305 to 385. The various blocks may be combined into fewer blocks, divided into additional blocks, and/or eliminated depending on the desired implementation. Example process 300 may be implemented by host-A 110A using virtual switch 116A and more particularly MAC learning module 160, etc. The example in FIG. 3 will be explained using FIG. 4, which is a schematic diagram illustrating example 400 of MAC address learning in virtualized computing environment 100.

(a) Learning Address Mapping Information

At 305 and 310 in FIG. 3, virtual switch 116A detects an egress packet (see also 410 in FIG. 4) that includes source MAC address=MAC1 via virtual port=VP1 151 associated with VM1 121. At 315, 325 and 335 in FIG. 3, in response to determination that MAC1 is not found in MAC table 162, virtual switch 116A learns address mapping information (source MAC address=MAC1, port ID=VP1), where "VP1" is a port ID associated with VP1 151. As shown at 420 in FIG. 4, the address mapping information is added to MAC table 162.

At 340 in FIG. 3, virtual switch 116A forwards egress packet 410 via NIC team 170 based on a NIC teaming policy. In practice, the forwarding process also includes a destination MAC address lookup to decide whether to forward egress packet 410 to a remote destination (i.e., not on host-A 110A) via NIC team 170 or local destination (i.e., another virtual machine on host-A 110A). In the case of remote destination, the NIC teaming policy is used to select PNIC1 171 to forward egress packet 410 to physical switch 180 located on physical network 102. Some example NIC teaming policies are discussed below.

In a first example, the NIC teaming policy may be based on a source or originating virtual port ID. In this case, PNIC1 171 may be selected for VM1 121 based on virtual port ID=VP1 and the number of PNICs (e.g., two). Once selected, packets received from VM1 121 via virtual port VP1 151 will always be forwarded using the same PNIC as long as VM1 121 runs on the same virtual port. This NIC teaming policy has the advantage of low resource consumption because the selection process is performed once, unless PNICs are added or removed from NIC team 170. Further, no changes on physical switch 180 are required, which should be contrasted with conventional approaches based on Link Aggregation Control Protocol (LACP), IP-based hashing, etc.

In a second example, a load-based NIC teaming policy may be used. Similar to the first example, PNIC1 171 may be selected for VM1 121 based on virtual port ID=VP1 and the number of PNICs. Additionally, virtual switch 116A checks the actual load at each PNIC (e.g., every 30 seconds), and if necessary, directs traffic away from overloaded PNIC(s). For example, when the load at PNIC1 171 exceeds a predetermined threshold (e.g., 75% of usage), a reassignment is performed, such as by moving a virtual machine with the highest input/output (I/O) to PNIC2 172. This NIC teaming policy also has the advantage of low resource consumption, and no changes to physical switch 180 are required.

(b) Traffic Loopback

Since no changes to physical switch 180 are required to implement the NIC teaming policies discussed above, physical switch 180 might be unaware of the configuration of NIC team 170 at host-A 110A. For example in FIG. 4, egress packet 410 may be a Broadcast, Unknown unicast and Multicast (BUM) packet that causes physical switch 180 to broadcast packet 410 via all of its ports except for switch port SP1 via which packet 410 is received. A first copy of packet 410 is sent via switch port SP3 (see 412 in FIG. 4). A second copy of packet 410 is sent via switch port SP2 (see 414 in FIG. 4) that connects to PNIC2 172, thereby causing a loopback.

Turning to FIG. 3 again, at 305 and 345, virtual switch 116A detects an ingress packet (i.e., loopback or reflected packet 410) that includes source MAC address=MAC1 via uplink port UP2 162 connected with PNIC2 172. At 350 in FIG. 3, virtual switch 116A performs a table lookup to find (MAC1, VP1) in MAC table 162. Note that VP1 is a virtual port associated with VNIC1 141 and VM1 121. At 355 and 360 in FIG. 3, in response to determination that the packet is not a MAC move advertisement (e.g., GARP, RARP, etc.), virtual switch 116A determines that a MAC move has not occurred. As such, as shown at 430 in FIG. 4, address mapping information (MAC1, VP1) is maintained (i.e., unchanged) and the packet is dropped. This should be contrasted against the conventional approach of updating the address mapping information based on the loopback packet, such as from (MAC1, VP1) to (MAC1, UP2). This incorrect update causes MAC1 to be no longer reachable from the network. Using the example in FIG. 3, the address mapping information is not updated when a loopback is detected.

Figure 5:
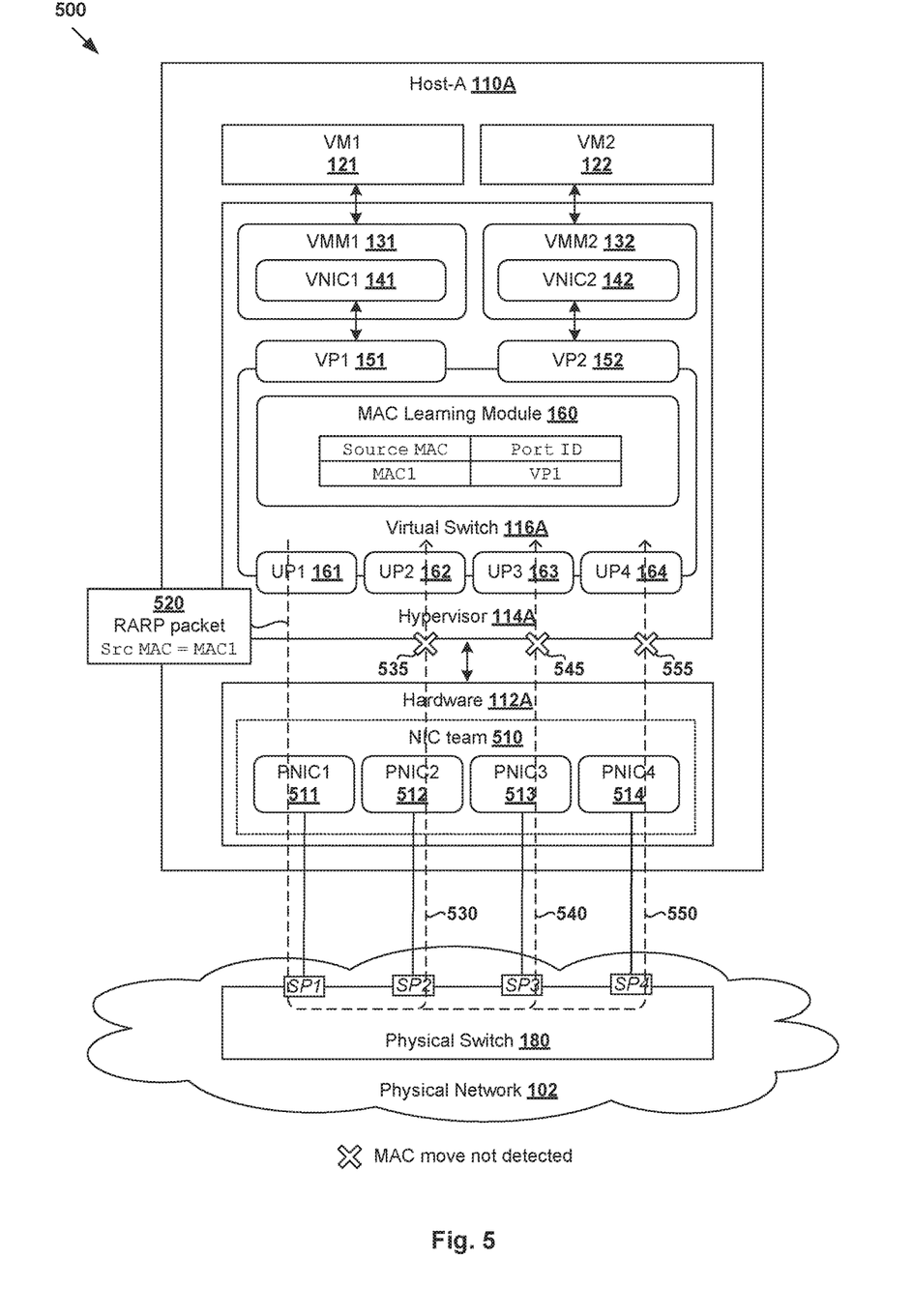
FIG. 5 is a schematic diagram illustrating an example of MAC address learning in the event of traffic loopback in a virtualized computing environment.

An example where the reflected packet is a MAC move advertisement and received via a NIC team formed by more than two PNICs is shown in FIG. 5, which is a schematic diagram illustrating example 500 of MAC address learning in the event of traffic loopback in a virtualized computing environment. In contrast with FIG. 4, host-A 110A includes NIC team 510 formed by four PNICs 511-514 connected to respective uplink ports 161-164 at virtual switch 116. RARP packet 520 with source MAC address=MAC1 is issued by hypervisor 114A (e.g., after VM1 131 is powered on) and sent via PNIC1 511. Since physical switch 180 may not be aware of NIC team 510 and RARP packet 520 has a broadcast destination, physical switch 180 reflects that packet back to host-A 110A. As shown at 530, 540 and 550 in FIG. 5, copies of RARP packet 520 are received by host-A 110A via uplink ports UP2 162 connected with PNIC2 512, UP3 163 connected with PNIC3 513 and UP4 164 connected with PNIC4 514, respectively.

As shown at 535, 545 and 555 in FIG. 5, virtual switch 116A determines that a MAC move has not occurred according to blocks 305, 345, 350 (yes case), 355 (yes case), 360 (yes case) and 365. In particular, in response to receiving RARP packet 530/540/550, it is determined whether VNIC1 141 of VM1 131 would have used associated PNIC 512/513/514 to send out RARP packet 520. In the example in FIG. 5, since PNIC1 511 is selected for VM1 131 based on a NIC teaming policy, RARP packets 530, 540 and 550 are determined to be loopback or reflected packets, which are dropped and not processed from a MAC learning standpoint.

In the example in FIG. 5, block 360 in FIG. 3 may be performed to detect reflected packets for the case of two or more PNICs configured as NIC team 170. In practice, in the case of two PNICs, a RARP packet that is sent via one PNIC may also be reflected via another PNIC because physical switch 180 is unaware of the NIC teaming. In this case, in response to detecting the RARP packet at block 355 in FIG. 3, another implementation of example process 300 in FIG. 3 may involve simply removing the address mapping information (MAC1, VP1) associated with source MAC address=MAC1 in the RARP packet (i.e., without checking whether the packet is reflected and although MAC1 has not moved). When a subsequent egress packet addressed from source MAC address=MAC1 is detected via VNIC1 141 and port VP1 151 of VM1, address mapping information (MAC1, VP1) may be relearned according to block 335 in FIG. 3.

(c) MAC Address Misconfiguration

Similar to the traffic loopback example, address mapping information (MAC1, VP1) is maintained (i.e., unchanged) when virtual switch 116A receives a non-advertisement packet that originates from another host due to MAC address misconfiguration, errors, etc. Referring to FIG. 4 again, physical switch 180 may receive a non-RARP packet (not shown for simplicity) that includes source MAC address=MAC1 via switch port SP3, and forwards it to host-A 110A via PNIC2 172. Based on address mapping information (MAC1, VP1) found in MAC table 162 and the type of the packet received (i.e., non-RARP), virtual switch 116A determines that a MAC move has not occurred and drops the packet. See corresponding blocks 305, 345, 350 (yes case), 355 (no case) and 365 in FIG. 3.

(d) MAC Move Between Virtual Ports

A MAC move may be detected by virtual switch 116A when it has previously learned an association between a particular MAC address and a virtual port, but detects an egress packet via a different virtual port. For example in FIG. 4, VM2 122 sends egress packet 450 that includes source MAC address=MAC1, which is the same MAC address previously used by VM1 121.

Turning to FIG. 3 again, at 305, 310, 315 (no case) and 325 (yes case), virtual switch 116A detects egress packet 450 via VP2 152, but finds address mapping information (MAC1, VP1) in MAC table 162. As such, according to 330 in FIG. 3, virtual switch 116A determines that a MAC move from VP1 151 to VP2 152 has occurred. As shown at 460 and 470 in FIG. 4, the address mapping information is updated to (MAC1, VP2), where "VP2" is an ID associated with VP2 152. Further, according to 340 in FIG. 3, egress packet 450 is sent via PNIC1 171 or PNIC2 172 of NIC team 170 based on a NIC teaming policy explained above (not shown in FIG. 4 for simplicity).

In practice, address mapping information in MAC table 162 is associated with a timestamp. Every time a subsequent packet that includes source MAC address=MAC1 is detected via VP2 152 (i.e., after the MAC move), the timestamp associated with (MAC1, VP2) will be refreshed according to block 320 in FIG. 3. A MAC address aging process is performed by virtual switch 116A to remove or delete entries that are older than a predetermined period of time. This ensures that MAC table 162 tracks active MAC addresses, and flushes out those that have not be used for a while.

(e) MAC Move Caused by Migration

In another example, a MAC move may be detected when a virtual machine is migrated from one host to another. An example will be described using FIG. 6, which is a schematic diagram illustrating example 600 of MAC address learning in the event of a migration in virtualized computing environment 100. In the example in FIG. 6, host-A 110A is connected with host-B 110B via physical switches 180, 182. At first physical switch 180, switch port labelled "SP1" and "SP2" are connected to respective PNIC1 171 and PNIC2 172 (at host-A 110A), while "SP3" is connected to "SP4" (at second physical switch 182). At second physical switch 182, switch ports labelled "SP5" and "SP6" are connected to respective PNIC3 173 and PNIC4 174 on host-B 110B. Similar to host-A 110A, host-B 110B includes hardware 112B to support hypervisor 114B, virtual switch 116B and various virtual machines (not all shown for simplicity).

Figure 6:
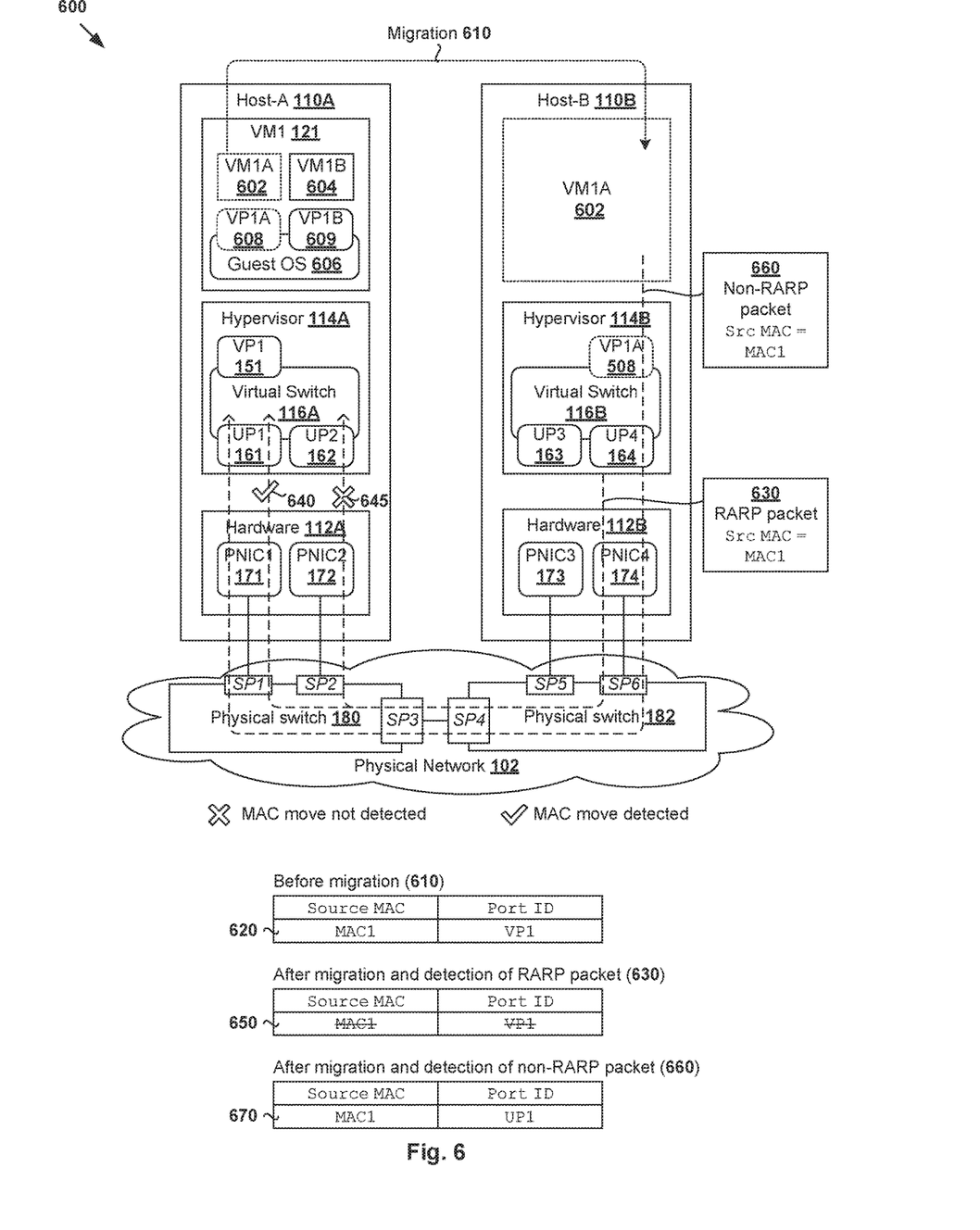
FIG. 6 is a schematic diagram illustrating an example of MAC address learning in the event of a migration in a virtualized computing environment.

According a nested configuration, host-A 110A implements VM1 121 (known as an "outer" virtual machine) that supports VM1A 602 and VM1 B 604 (known as "inner" virtual machines). Similar to hypervisor 114A, guest OS 606 associated with outer VM1 121 supports a virtual switch (not shown for simplicity) that handles packet forwarding to and from VM1A 602 via virtual port VP1A 608, as well as VM1 B 604 via virtual port VP1B 609. Unlike containerized applications that are generally OS-less (i.e., without any OS), inner VM1A 602 and VM1 B 604 each run their own guest OS and application(s) like any other virtual machines.

When an outer virtual machine such as VM1 121 is migrated, its virtual port VP1 151 is disconnected from source host-A 110A and reconnected on destination host-B 110B. Since host-A 110A no longer supports VP1 151, virtual switch 116A will remove address mapping information (MAC1, VP1) learned in the example in FIG. 4. After the migration, hypervisor 114B at destination host-B 110B will issue a MAC move advertisement (e.g., RARP packet) such that physical switches 180-181 are able to learn that MAC address=MAC1 associated with VP1 151 has moved. In this case, according to blocks 305, 345, 350 (no case), 375

(no case) and 385 in FIG. 3, virtual switch 116A learns new address mapping information that associates MAC1 with an uplink port via which the MAC move advertisement is received at host-A 110A.

In contrast, when an inner virtual machine such as VM1A 602 is migrated (see 610 in FIG. 6), virtual port VP1A 608 is migrated, but VP1 151 remains on host-A 110A. This is because outer VM1 121 associated with VP1 151 is still running to support inner VM1 B 604. In this case, as shown at 620 in FIG. 6, virtual switch 116A still stores address mapping information (MAC1, VP1), where MAC1 is a MAC address associated with VM1A 602. In this case, the address mapping information may be updated as follows.

Referring to the example in FIG. 3 again, at 305 and 345, virtual switch 116A receives a RARP packet (see 630 in FIG. 6) with source MAC address=MAC1 via uplink port=UP1 161 connected with PNIC1 171. As shown at 630 in FIG. 6, a RARP packet is generated by hypervisor 114B in response to the migration of VM1A 602 to host-B 110B. RARP packet 630 is forwarded to host-A 110A via ports SP6 and SP4 at second physical switch 182, as well as ports SP3 and SP1 at first physical switch 180.

At 350 (yes case), 355 (yes case) and 360 in FIG. 3, in response to determination that address mapping information (MAC1, VP1) is found in MAC table 162 and a MAC move advertisement is received, virtual switch 116A determines whether a MAC move has occurred. As shown at 640 in FIG. 6, a MAC move is detected based on RARP packet 630 received via uplink port=UP1 161 connected with PNIC1 171, and the NIC teaming policy that assigns the same PNIC1 171 VM1 121. This has the effect of determining whether uplink port=UP1 161 and associated PNIC1 171 via which RARP packet 630 is received would have been used by VM1 121 associated with VP1 151 according to the NIC teaming policy.

As shown at 645 in FIG. 6, since RARP packets usually have a broadcast destination, physical switch 180 also delivers a duplicate RARP packet via SP2, which is connected to PNIC2 172 at host-A 110A. This will not result in a MAC move, and the duplicate RARP packet is dropped. In practice, it is also possible that the RARP packet is delivered via SP2 before being delivered via SP1. In this case, however, the RARP packet received via UP2 162 and PNIC2 172 (i.e., connected to SP2) will not cause a MAC move. When the RARP packet is received via UP1 161 and PNIC1 171 (i.e., connected to SP1), a MAC move is detected because UP1 161 and PNIC1 171 would have been selected for VM1 121 associated with VP1 151 according to the NIC teaming policy.

As shown at 650 in FIG. 6, in response to detecting the MAC move, virtual switch 116A updates address mapping information by removing (MAC1, VP1) according to block 370 in FIG. 3. After (MAC1, VP1) is removed, virtual switch 116A has no information as to where packets addressed to destination MAC=MAC1 should be forwarded. In this case, those packets will be broadcasted, which means network connectivity will not be affected during this period.

As shown at 660 in FIG. 6, virtual switch 116A learns new address mapping information based on a subsequent non-RARP packet from VM1A 602 at destination host-B 110B. In practice, non-RARP packet 660 may be a data packet from VM1A 602 to VM2 122 (not shown in FIG. 6 for simplicity). Non-RARP packet 660 is also forwarded to host-A 110A via ports SP6 and SP4 at second physical switch 182, and ports SP3 and SP1 at first physical switch 180.

According to blocks 305, 345, 350 (no case) and 375 (no case) in FIG. 3, in response to host-A 110A receiving non-RARP packet 660 with source MAC address=MAC1 via uplink port=UP1 161 connected with PNIC1 171, virtual switch 116A determines that there is no address mapping information associated with MAC1. In this case, as shown at 670 in FIG. 6, virtual switch 116A stores (MAC1, UP1), performs a destination MAC address lookup before forwarding non-RARP packet 660 to its destination according to block 385 in FIG. 3. As such, MAC address=MAC1 is moved from VP1 (see 620 in FIG. 6) to UP1 (see 670 in FIG. 6).

Note that In the event that RARP packet 630 is received via a different uplink port UP2 162 connected with PNIC2 172 not assigned to VM1 121 according to the NIC teaming policy, it is determined that RARP packet 630 is caused by a loopback according to 355 (yes case), 360 (no case) and 365 in FIG. 3. This scenario may occur when RARP packet 630 is a legitimate RARP packet sent by VM1 121 and looped back by NIC team 170 similar to the example in FIG. 4.

(f) MAC Move Caused by Failover

Figure 7:
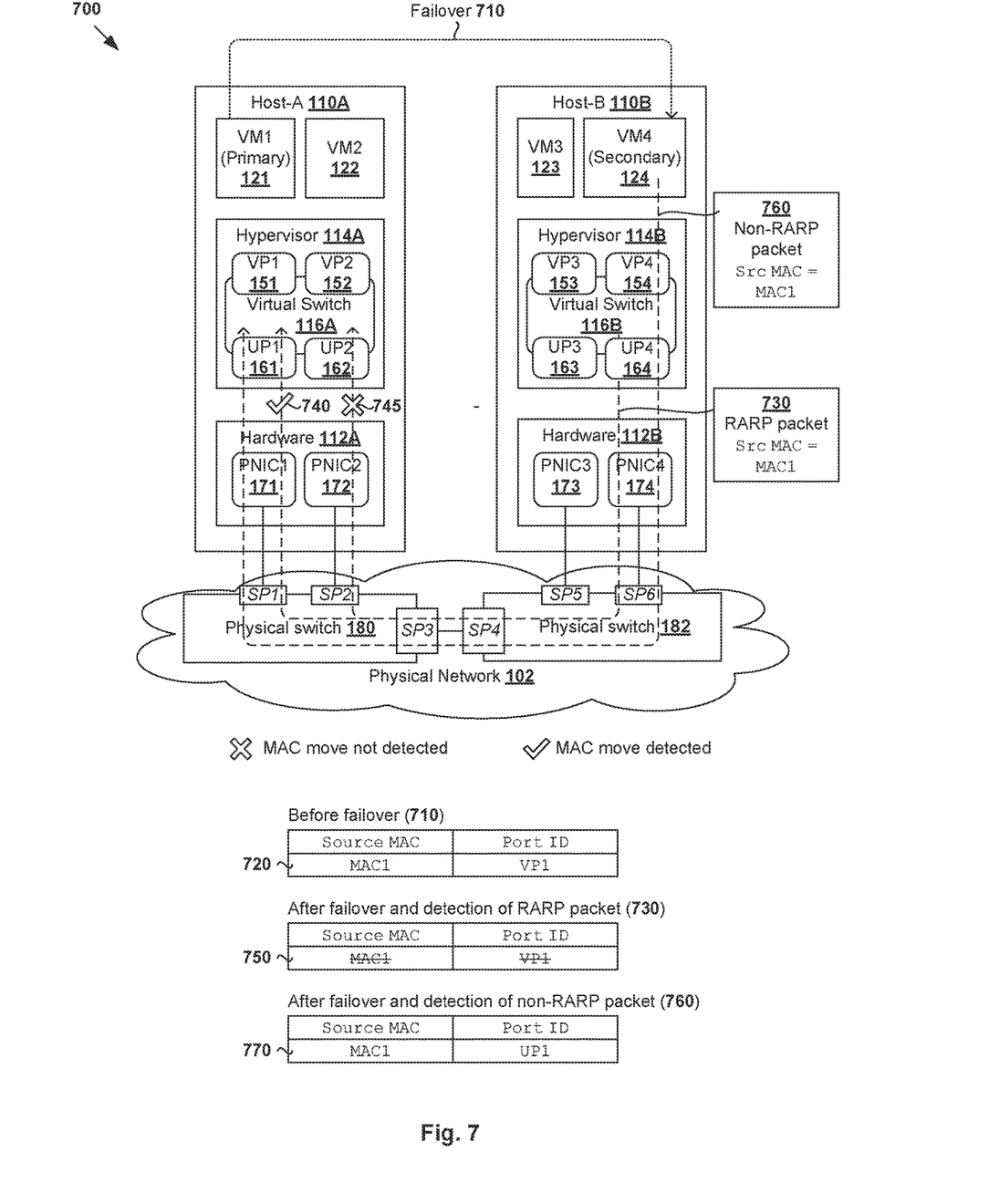
FIG. 7 is a schematic diagram illustrating an example of MAC address learning in the event of a failover in a virtualized computing environment.

In a further example, a MAC move may be detected in a distributed cluster environment in which a high availability (HA) pair is configured for fault tolerance purposes. An example is shown in FIG. 7, which is a schematic diagram illustrating example 700 of MAC address learning in the event of a failover in virtualized computing environment 100. VM1 121 on host-A 110A and VM4 124 on host-B 110B are configured with respective primary and secondary roles. Primary VM1 121 is usually active and uses virtual MAC address=MAC1 to communicate with other endpoints. VM1 121 also exchanges heartbeat information (e.g., inputs, events, etc.) with VM4 124 to maintain a virtual lockstep with each other.

As shown at 710 in FIG. 7, in the event of a failure at primary VM1 121, secondary VM4 124 takes over and starts using MAC1 according to a failover mechanism. In this case, as shown at 720 in FIG. 7, virtual switch 116A still stores address mapping information (MAC1, VP1), which may be updated as follows.

As shown at 730 in FIG. 7, in response to the failover, hypervisor 114B at host-B 110B generates and sends an RARP packet to advertise the (virtual) MAC address=MAC1 of VM4 124 such that physical switches 180, 182 may update their MAC table accordingly. RARP packet 730 also reaches host-A 110A via ports SP6 and SP4 at second physical switch 182, as well as ports SP3 and SP1 at first physical switch 180.

As shown at 740 in FIG. 7, virtual switch 116A detects a MAC move based on RARP packet 730 received via uplink port=UP1 161 and PNIC1 171 and the NIC teaming policy that assigns the same PNIC1 171 to VM1 121. See corresponding blocks 305, 345, 350 (yes case), 355 (yes case) and 360 (yes case) in FIG. 3. As shown at 745 in FIG. 7, physical switch 180 also delivers a duplicate RARP packet via SP2, which is connected to PNIC2 172 at host-A 110A. Similar to the example in FIG. 6, this will not result in a MAC move, and the duplicate RARP packet is dropped. Also, in practice, it is also possible that the RARP packet is delivered via SP2 before being delivered via SP1. In this case, however, the RARP packet received via PNIC2 172 (i.e., connected to SP2) will not cause a MAC move. When the RARP packet is received via PNIC1 171 (i.e., connected to SP1), a MAC move is detected.

As shown at 750 in FIG. 7, virtual switch 116A removes address mapping information (MAC1, VP1) from MAC table 162 according to block 370 in FIG. 3. After (MAC1, VP1) is removed, virtual switch 116A has no information as to where packets addressed to MAC1 should be forwarded. However, network connectivity will not be affected during this period because the packets will be broadcasted.

As shown at 760 in FIG. 7, after the failover, VM4 124 on host-B 110B sends a non-RARP packet addressed from MAC1 to, for example, VM2 122 on host-A 110A. In response to receiving non-RARP packet 760 with source MAC address=MAC1 via uplink port=UP1 161 connected with PNIC1 171, virtual switch 116A determines that there is no address mapping information associated with MAC1 according to blocks 305, 345, 350 (no case) and 375 (no case) in FIG. 3.

As shown at 770 in FIG. 7, virtual switch 116A stores (MAC1, UP1) in MAC table 162 before forwarding non-RARP packet 760 to its destination according to block 385 in FIG. 3. As such, MAC1 is moved from VP1 (see 720 in FIG. 7) to UP1 161 connected with PNIC1 171 (see 770 in FIG. 7) after the failover. When virtual switch 116A receives a subsequent packet addressed to MAC1 via uplink port=UP1 161, a timestamp associated with (MAC1, UP1) may be refreshed according to block 380 in FIG. 3.

Although the migration example in FIG. 6 and failover example in FIG. 7 have been explained using virtual machines, it should be understood that example process 300 may be implemented for any suitable virtualized computing instances, such as containerized applications (e.g., Docker, etc.). For example, in the event of a migration of a container from source host-A 110A to destination host-B 110B, MAC table 162 may be updated based on a RARP packet issued by hypervisor 114B (provided that it is aware of the migration and able to issue RARP packets for containers) and a subsequent non-RARP packet sent by the container.

Although examples of the present disclosure have been explained using multiple PNICs (see 171-172 in FIGS. 1 and 511-514 in FIG. 5) that are connected to single physical switch 180, it should be understood that the multiple PNICs may be connected to different physical switches. In this case, if there is a failure at one physical switch, another physical switch will be available as a failover.

Computer System

The above examples can be implemented by hardware (including hardware logic circuitry), software or firmware or a combination thereof. The above examples may be implemented by any suitable computing device, computer system, etc. The computer system may include processor(s), memory unit(s) and PNIC(s) that may communicate with each other via a communication bus, etc. The computer system may include a non-transitory computer-readable medium having stored thereon instructions or program code that, when executed by the processor, cause the processor to perform processes described herein with reference to FIG. 1 to FIG. 7. For example, a computer system capable of acting as host 110A/110B/110C may be deployed in virtualized computing environment 100.

The techniques introduced above can be implemented in special-purpose hardwired circuitry, in software and/or firmware in conjunction with programmable circuitry, or in a combination thereof. Special-purpose hardwired circuitry may be in the form of, for example, one or more application-specific integrated circuits (ASICs), programmable logic devices (PLDs), field-programmable gate arrays (FPGAs), and others. The term 'processor' is to be interpreted broadly to include a processing unit, ASIC, logic unit, or programmable gate array etc.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or any combination thereof.

Those skilled in the art will recognize that some aspects of the embodiments disclosed herein, in whole or in part, can be equivalently implemented in integrated circuits, as one or more computer programs running on one or more computers (e.g., as one or more programs running on one or more computing systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure.

Software and/or to implement the techniques introduced here may be stored on a non-transitory computer-readable storage medium and may be executed by one or more general-purpose or special-purpose programmable microprocessors. A "computer-readable storage medium", as the term is used herein, includes any mechanism that provides (i.e., stores and/or transmits) information in a form accessible by a machine (e.g., a computer, network device, personal digital assistant (PDA), mobile device, manufacturing tool, any device with a set of one or more processors, etc.). A computer-readable storage medium may include recordable/non recordable media (e.g., read-only memory (ROM), random access memory (RAM), magnetic disk or optical storage media, flash memory devices, etc.).

The drawings are only illustrations of an example, wherein the units or procedure shown in the drawings are not necessarily essential for implementing the present disclosure. Those skilled in the art will understand that the units in the device in the examples can be arranged in the device in the examples as described, or can be alternatively located in one or more devices different from that in the examples. The units in the examples described can be combined into one module or further divided into a plurality of sub-units.

We claim:

1. A method for a host to perform Media Access Control (MAC) address learning in a virtualized computing environment, wherein the host includes multiple physical network interface controllers (NICs) configured as a team to connect the host to a physical network, and the method comprises:

in response to detecting an egress packet that includes a source MAC address from a virtualized computing instance supported by the host,
learning address mapping information that associates the source MAC address with a virtual port via which the egress packet is received; and
sending the egress packet to the physical network via a first physical NIC selected from the team based on a NIC teaming policy; and in response to detecting an ingress packet that also includes the source MAC address;
determining whether the source MAC address has moved based on whether the ingress packet is received from the physical network via the first physical NIC selected by the NIC teaming policy, or a second physical NIC from the team; and in response to determination that the source MAC address has moved, updating the address mapping information such that the source MAC address is no longer associated with the virtual port, but otherwise, maintaining the address mapping information.

2. The method of claim 1, wherein determining whether the source MAC address has moved comprises:

in response to determination that the ingress packet is a MAC move advertisement that is received via the first physical NIC, determining that the source MAC address has moved.

3. The method of claim 2, wherein the method further comprises:

in response to detecting a further ingress packet that includes the source MAC address via an uplink port connected with the first physical NIC, learning address mapping information that associates the source MAC address with the uplink port.

4. The method of claim 2, wherein detecting the ingress packet comprises:

detecting the MAC move advertisement generated by another host in response to a migration of the virtualized computing instance, or a failover from the virtualized computing instance configured with a primary role to another virtualized computing instance configured with a secondary role.

5. The method of claim 1, wherein determining whether the source MAC address has moved comprises:

in response to determination that the ingress packet is a MAC move advertisement that is received via the second physical NIC not selected by the NIC teaming policy, determining that the source MAC address has not moved and dropping the ingress packet.

6. The method of claim 1, wherein determining whether the source MAC address has moved comprises:

in response to determination that the ingress packet is not a MAC move advertisement that is received either via the first physical NIC or the second physical NIC, determining that the source MAC address has not moved and dropping the ingress packet.

7. The method of claim 1, wherein sending the egress packet comprises:

based on the NIC teaming policy, selecting the first physical NIC based on an identifier associated with the virtual port via which the egress packet is received.

8. A non-transitory computer-readable storage medium that includes a set of instructions which, in response to execution by a processor of a host, cause the processor to perform a method of Media Access Control (MAC) address learning in a virtualized computing environment, wherein the host includes multiple physical network interface controllers (NICs) configured as a team to connect the host to a physical network, and the method comprises:

in response to detecting an egress packet that includes a source MAC address from a virtualized computing instance supported by the host,
learning address mapping information that associates the source MAC address with a virtual port via which the egress packet is received; and
sending the egress packet to the physical network via a first physical NIC selected from the team based on a NIC teaming policy; and in response to detecting an ingress packet that also includes the source MAC address;

determining whether the source MAC address has moved based on whether the ingress packet is received from the physical network via the first physical NIC selected by the NIC teaming policy, or a second physical NIC from the team; and in response to determination that the source MAC address has moved, updating the address mapping information such that the source MAC address is no longer associated with the virtual port, but otherwise, maintaining the address mapping information.

9. The non-transitory computer-readable storage medium of claim 8, wherein determining whether the source MAC address has moved comprises:

in response to determination that the ingress packet is a MAC move advertisement that is received via the first physical NIC, determining that the source MAC address has moved.

10. The non-transitory computer-readable storage medium of claim 9, wherein the method further comprises:

in response to detecting a further ingress packet that includes the source MAC address via an uplink port connected with the first physical NIC, learning address mapping information that associates the source MAC address with the uplink port.

11. The non-transitory computer-readable storage medium of claim 9, wherein detecting the ingress packet comprises:

detecting the MAC move advertisement generated by another host in response to a migration of the virtualized computing instance, or a failover from the virtualized computing instance configured with a primary role to another virtualized computing instance configured with a secondary role.

12. The non-transitory computer-readable storage medium of claim 8, wherein determining whether the source MAC address has moved comprises:

in response to determination that the ingress packet is a MAC move advertisement that is received via the second physical NIC not selected by the NIC teaming policy, determining that the source MAC address has not moved and dropping the ingress packet.

13. The non-transitory computer-readable storage medium of claim 8, wherein determining whether the source MAC address has moved comprises:

in response to determination that the ingress packet is not a MAC move advertisement that is received either via the first physical NIC or the second physical NIC, determining that the source MAC address has not moved and dropping the ingress packet.

14. The non-transitory computer-readable storage medium of claim 8, wherein sending the egress packet comprises:

based on the NIC teaming policy, selecting the first physical NIC based on an identifier associated with the virtual port via which the egress packet is received.

15. A host configured to perform Media Access Control (MAC) address learning in a virtualized computing environment, wherein the host comprises:

a processor;
multiple physical network interface controllers (NICs) configured as a team to connect the host to a physical network; and
a non-transitory computer-readable medium having stored thereon instructions that, in response to execution by the processor, cause the processor to:

in response to detecting an egress packet that includes a source MAC address from a virtualized computing instance supported by the host,
  learn address mapping information that associates the source MAC address with a virtual port via which the egress packet is received; and
  send the egress packet to the physical network via a first physical NIC selected from the team based on a NIC teaming policy; and
in response to detecting an ingress packet that also includes the source MAC address;
  determine whether the source MAC address has moved based on whether the ingress packet is received from the physical network via the first physical NIC selected by the NIC teaming policy, or a second physical NIC from the team; and
  in response to determination that the source MAC address has moved, update the address mapping information such that the source MAC address is no longer associated with the virtual port, but otherwise, maintain the address mapping information.

16. The host of claim 15, wherein the instructions for determining whether the source MAC address has moved cause the processor to:
  in response to determination that the ingress packet is a MAC move advertisement that is received via the first physical NIC, determine that the source MAC address has moved.

17. The host of claim 16, wherein the instructions further cause the processor to:
  in response to detecting a further ingress packet that includes the source MAC address via an uplink port connected with the first physical NIC, learning address mapping information that associates the source MAC address with the uplink port.

18. The host of claim 16, wherein the instructions for detecting the ingress packet cause the processor to:
  detect the MAC move advertisement generated by another host in response to a migration of the virtualized computing instance, or a failover from the virtualized computing instance configured with a primary role to another virtualized computing instance configured with a secondary role.

19. The host of claim 15, wherein the instructions for determining whether the source MAC address has moved cause the processor to:
  in response to determination that the ingress packet is a MAC move advertisement that is received via the second physical NIC not selected by the NIC teaming policy, determine that the source MAC address has not moved and dropping the ingress packet.

20. The host of claim 15, wherein the instructions for determining whether the source MAC address has moved cause the processor to:
  in response to determination that the ingress packet is not a MAC move advertisement that is received either via the first physical NIC or the second physical NIC, determine that the source MAC address has not moved and dropping the ingress packet.

21. The host of claim 15, wherein the instructions for sending the egress packet cause the processor to:
  based on the NIC teaming policy, select the first physical NIC based on an identifier associated with the virtual port via which the egress packet is received.

* * * * *